(12) United States Patent  
Webster

(10) Patent No.: US 8,291,710 B2
(45) Date of Patent: Oct. 23, 2012

(54) GAS TURBINE ENGINE EXHAUST NOZZLE HAVING A COMPOSITE ARTICLE HAVING A SHAPE MEMORY MATERIAL MEMBER

(75) Inventor: John Richard Webster, Derby (GB)

(73) Assignee: Rolls-Royce PLC (GB)

( * ) Notice: Subject to any disclaimer, the term of this patent is extended or adjusted under 35 U.S.C. 154(b) by 808 days.

(21) Appl. No.: 12/419,450

(22) Filed: Apr. 7, 2009

(65) Prior Publication Data
US 2009/0301094 A1    Dec. 10, 2009

(30) Foreign Application Priority Data

Apr. 28, 2008 (GB) .................................. 0807593.9

(51) Int. Cl.
F02K 1/00 (2006.01)
(52) U.S. Cl. ...... 60/771; 60/770; 60/226.1; 239/265.39; 239/265.19; 428/292.1
(58) Field of Classification Search .................. 60/770, 60/771, 226.1, 262; 239/265.19, 265.39, 239/265.43; 428/292.1
See application file for complete search history.

(56) References Cited

U.S. PATENT DOCUMENTS

| | | | | |
|---|---|---|---|---|
| 4,131,701 A * | 12/1978 | VanAuken | ..... | 138/143 |
| 4,563,232 A * | 1/1986 | Peake | ..... | 156/182 |
| 4,621,769 A * | 11/1986 | Szuminski | ..... | 239/265.39 |
| 5,614,305 A | 3/1997 | Paine et al. | | |
| 5,619,177 A * | 4/1997 | Johnson et al. | ..... | 337/140 |
| 5,804,276 A * | 9/1998 | Jacobs et al. | ..... | 428/110 |
| 5,931,422 A * | 8/1999 | Geiger et al. | ..... | 244/214 |
| 6,087,467 A * | 7/2000 | Marrocco et al. | ..... | 528/125 |
| 6,318,070 B1 * | 11/2001 | Rey et al. | ..... | 60/226.3 |
| 6,555,488 B1 * | 4/2003 | Qiu et al. | ..... | 442/205 |
| 6,718,752 B2 * | 4/2004 | Nesbitt et al. | ..... | 60/204 |
| 6,989,197 B2 * | 1/2006 | Schneider | ..... | 428/416 |
| 7,004,047 B2 * | 2/2006 | Rey et al. | ..... | 74/469 |
| 7,085,388 B2 * | 8/2006 | Butler et al. | ..... | 381/71.3 |
| 7,216,831 B2 * | 5/2007 | Wood | ..... | 244/99.8 |
| 7,340,883 B2 * | 3/2008 | Wood et al. | ..... | 60/226.1 |
| 7,546,727 B2 * | 6/2009 | White | ..... | 60/204 |
| 7,578,132 B2 * | 8/2009 | Webster | ..... | 60/770 |
| 7,644,575 B2 * | 1/2010 | Wood et al. | ..... | 60/204 |
| 7,958,733 B2 * | 6/2011 | Turner et al. | ..... | 60/770 |
| 2004/0050171 A1 * | 3/2004 | Ogisu et al. | ..... | 73/774 |
| 2004/0175555 A1 | 9/2004 | Ogisu | | |
| 2010/0018212 A1 * | 1/2010 | Core | ..... | 60/771 |
| 2010/0146932 A1 * | 6/2010 | Webster | ..... | 60/204 |
| 2011/0300358 A1 * | 12/2011 | Blohowiak et al. | ..... | 428/215 |

FOREIGN PATENT DOCUMENTS

| EP | 1239151 | 3/2001 |
|---|---|---|
| JP | 2005297437 | 4/2004 |
| JP | 2007268940 | 3/2006 |

* cited by examiner

*Primary Examiner* — William H Rodriguez
(74) *Attorney, Agent, or Firm* — McCormick, Paulding & Huber LLP

(57) ABSTRACT

A composite article includes a composite member, a flexible member and at least one shape memory material member. The composite member has longitudinally extending fibers in a matrix material. The at least one shape memory material member extends substantially parallel to the composite member and the flexible member is positioned between the composite member and the at least one shape memory material member to bond the at least one shape memory material member to the composite member. The composite article is particularly suitable for use as a tab for an exhaust nozzle of a turbofan gas turbine engine.

25 Claims, 3 Drawing Sheets

GAS TURBINE ENGINE EXHAUST NOZZLE HAVING A COMPOSITE ARTICLE HAVING A SHAPE MEMORY MATERIAL MEMBER

CROSS REFERENCE TO RELATED APPLICATION

This application is entitled to the benefit of British Patent Application No. GB 0807593.9, filed on Apr. 28, 2008.

FIELD OF THE INVENTION

The present invention relates to a gas turbine engine exhaust nozzle having a composite article that includes a shape memory material member.

BACKGROUND OF THE INVENTION

It is known to provide tabs on variable exhaust nozzles of gas turbine engines in order to vary the area of the exhaust nozzle at different operating conditions of the gas turbine engine. These tabs are moved between a deployed position and a non-deployed position by various actuators. One known tab arrangement uses shape memory material members to move a metallic member between the non-deployed and the deployed positions, for example as disclosed in published European patent application EP1612416A1.

It is known to provide composite articles with shape memory material members but these have experienced compromises in the stiffness and/or deflection due to the different operating strains of the shape memory material members and the parent composite article. Published International patent application WO2006/046008A1 discloses providing shape memory material wires woven with fibres in a composite article.

SUMMARY OF THE INVENTION

Accordingly, the present invention seeks to provide a novel gas turbine engine exhaust nozzle having a composite article that includes a shape memory material member, which reduces, preferably overcomes, the above-mentioned problem.

Accordingly, the present invention provides a gas turbine engine having an exhaust nozzle, the exhaust nozzle having a downstream end, at least one tab extending in a downstream direction from the downstream end of the exhaust nozzle, the tab having a composite article, that preferably has a composite member, a flexible member and at least one shape memory material member. The shape memory material member extending substantially parallel to the composite member and the flexible member being positioned between the composite member and the shape memory material member to bond the shape memory material member to the composite member and to maintain a separation between the composite member and the shape memory material member. The shape memory material member having an actuator to move the tab between a second non-deployed position and a first deployed position.

Preferably, the composite member having longitudinally extending fibres in a matrix material.

Preferably, the shape memory material member has a plurality of shape memory material wires.

Alternatively, the shape memory material member includes a plurality of shape memory material tapes.

Preferably, the shape memory material member is embedded in the flexible member.

Preferably, the shape memory material member includes shape memory alloy or shape memory metal.

Preferably, a heat conducting member is provided around the shape memory material member.

Preferably, the heat conducting member is embedded in the flexible member and extends to an exterior surface of the flexible member. Preferably, the heat conducting member includes a metal, for example aluminum.

Preferably, the shape memory material tapes are embedded in the flexible member and a portion of each tape projects outwardly from the flexible member to form cooling fins.

Preferably, a thermal conductor layer or a thermal insulator layer is provided on the shape memory material member.

Preferably, the thermal insulator layer or thermal conductor layer is arranged on the shape memory material member, partially on the shape memory material member and partially on an exterior surface of the flexible member or on an exterior surface of the flexible member.

Preferably, the composite member is stressed in bending and the shape memory material member is pre-stressed in tension or compression.

Preferably, the shape memory material member is a magnetic shape memory material member, an electric shape memory material memory member or a heat shape memory material member.

Preferably, the composite member comprises laterally extending fibres arranged perpendicularly to the longitudinally extending fibres.

Preferably, the laterally extending fibres are woven with the longitudinally extending fibres.

Alternatively, the composite member comprises chopped fibres.

The exhaust nozzle may be a fan exhaust nozzle or a core exhaust nozzle.

Preferably, there are heating means to heat the at least one shape memory material member such that the shape memory material member moves the composite member between the second non-deployed position and the first deployed position.

The present invention also provides a composite article that includes a composite member, a flexible member and a shape memory material member, the shape memory material member extending substantially parallel to the composite member and the flexible member being positioned between the composite member and the shape memory material member to bond the shape memory material member to the composite member and to maintain a separation between the composite member and the shape memory material member, the shape memory material member includes an actuator to move the composite article between a non-deployed position and a deployed position.

DETAILED DESCRIPTION OF THE PREFERRED EMBODIMENTS

Figure 1:
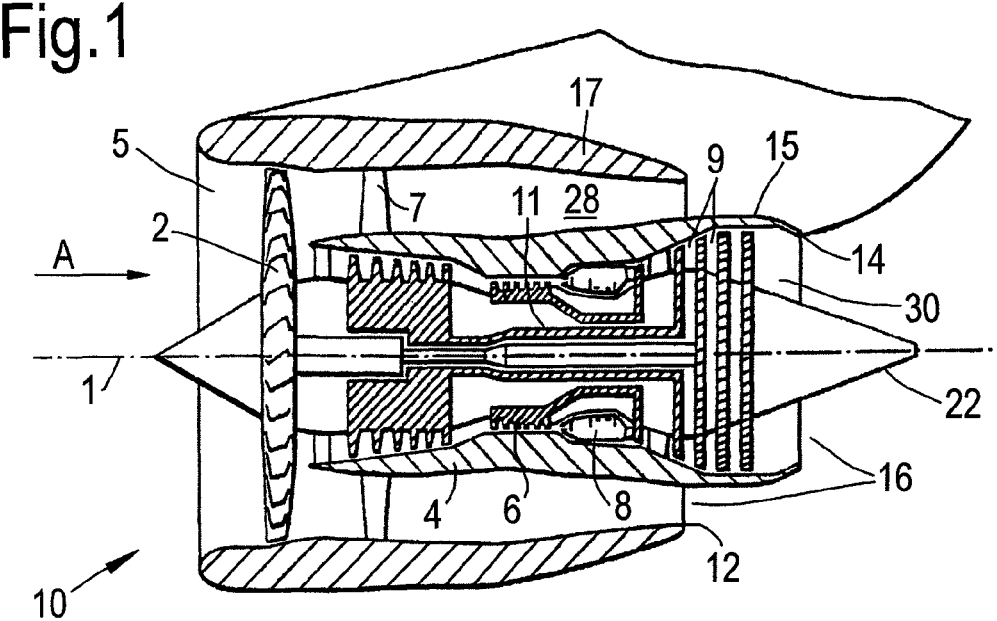
FIG. 1 shows a turbofan gas turbine engine having an exhaust nozzle having noise reducing tabs that include a composite article according to the present invention.

A turbofan gas turbine engine 10, as shown in FIG. 1, comprises in axial flow series an air intake 5, a propulsive fan 2, a core engine 4 and an exhaust nozzle assembly 16 all disposed about an engine axis 1. The core engine 4 comprises in axial flow series a series of compressors 6, a combustor 8 and a series of turbines 9. The direction of airflow through the turbofan gas turbine engine 10 in operation is indicated by arrow A and the terms upstream and downstream are used with reference to this general flow direction. Air is drawn through the air intake 5 and is compressed by the fan 2. The airflow from the fan 2 is split between a flow through the core engine 4 and a bypass flow. The flow through the core engine 4 flows through the compressors 6 where it is further compressed and into the combustor 8 where it is mixed with fuel and the fuel is burnt in the air in the combustor 8. The combustion of the fuel in the compressed air in the combustor 8 produces hot gases, which exit the combustor 8 and flow downstream through and drive the turbines 9. The turbines 9 drive the compressors 6 and fan 2 via shafts 11 which drivingly connect the turbines 9 with the compressors 6 and the fan 2.

The exhaust gases leaving the turbine 9 flow through the exhaust nozzle assembly 16 to provide propulsive thrust. The remainder of the air from the fan 2, the bypass flow, flows within a bypass duct 7 around the core engine 4. The bypass flow, which has been accelerated by the fan 2 also flows to the exhaust nozzle assembly 16 where it is exhausted, as a bypass exhaust stream to provide further, the majority of the, propulsive thrust.

The velocity of the bypass exhaust stream is significantly lower than the velocity of the core engine exhaust stream. Turbulent mixing of the bypass exhaust stream and the core engine exhaust stream occurs in the region of, and downstream of, the exhaust nozzle assembly 16. These two exhaust streams also mix with the ambient air surrounding and downstream of the exhaust nozzle assembly 16. This mixing of the two exhaust streams and the ambient air produces noise.

The exhaust nozzle assembly 16 comprises two concentric exhaust nozzles, a radially outer bypass exhaust nozzle 12 and a radially inner core exhaust nozzle 14. The core exhaust nozzle 14 is defined at its radially outer extent by a generally frusto-conical core nozzle wall 15 and at its radially inner extent by a frusto-conical engine plug structure 22. The bypass exhaust nozzle 12 is defined its radially outer extent by a nacelle 17 and at its radially inner extent by the nozzle wall 15.

Figure 2:
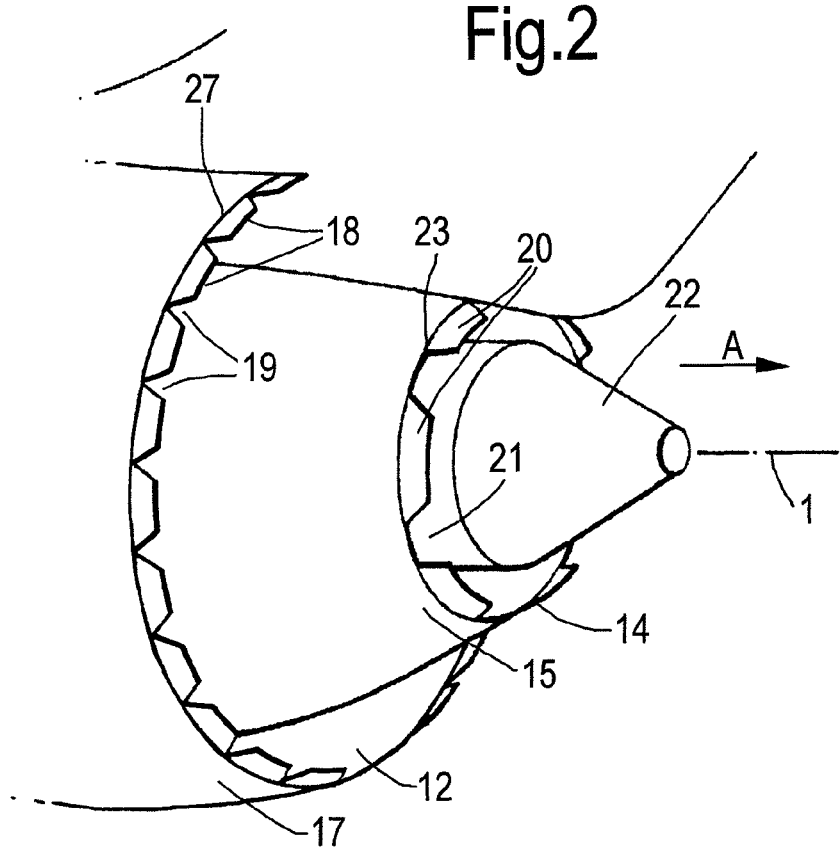
FIG. 2 is an enlarged perspective view of the exhaust nozzle having noise reducing tabs that include a composite article according to the present invention.

The exhaust nozzle assembly 16 is shown more clearly in FIG. 2 and it comprises noise reduction apparatus having a number of tabs. A plurality of circumferentially spaced tabs 20 extend from the downstream end of the core exhaust nozzle 14 and in particular from the downstream end of the frusto-conical core nozzle wall 15. As shown, the tabs 20 are of trapezoidal shape with the sides of the tabs 20 circumferentially tapering away from each other in a downstream direction to form a plurality of circumferentially disposed notches, or spaces, 21 defined between adjacent tabs 20. The notches 21 are complementary to the shape of the tabs 20 and are of trapezoidal shape with the notches 21 increasing in dimension in a downstream direction. The tabs 20 and notches 21 are evenly circumferentially spaced.

Similarly, a plurality of circumferentially spaced tabs 18 extend from the downstream end 27 of the bypass exhaust nozzle 12 and in particular from the downstream end of the nacelle 17. As shown, the tabs 18 are of trapezoidal shape with the sides of the tabs 18 circumferentially tapering away from each other in a downstream direction to form a plurality of circumferentially disposed notches, or spaces, 19 defined between adjacent tabs 18. The notches 19 are complementary to the shape of the tabs 18 and are of trapezoidal shape with the notches 19 increasing in dimension in a downstream direction. The tabs 18 and notches 19 are evenly circumferentially spaced.

Figure 3:
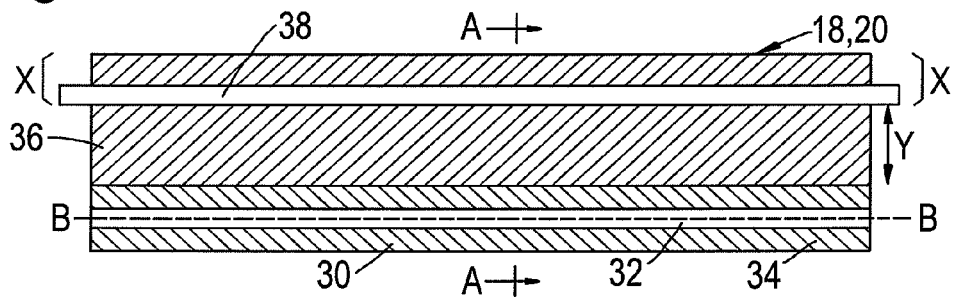
FIG. 3 is an enlarged cross-sectional view of a noise reducing tab having a composite article according to the present invention.
Figure 4:
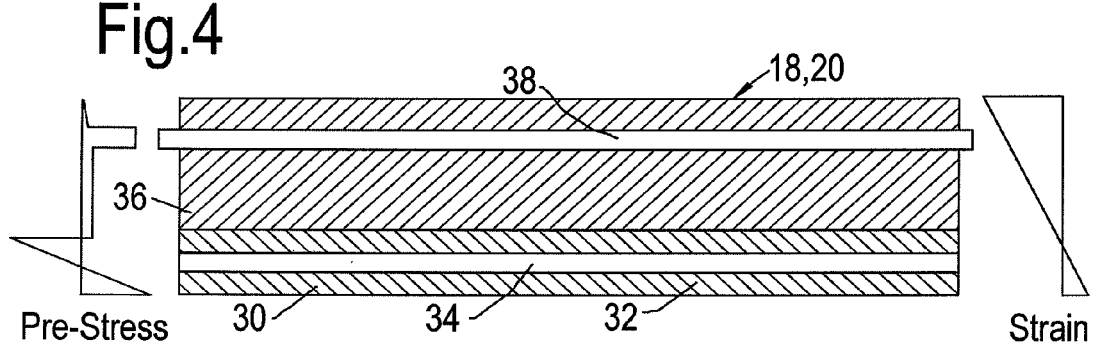
FIG. 4 is an identical cross-sectional view of a noise reducing tab and shows the pre-stress in the noise reducing tab and the strain during operation.
Figure 5:
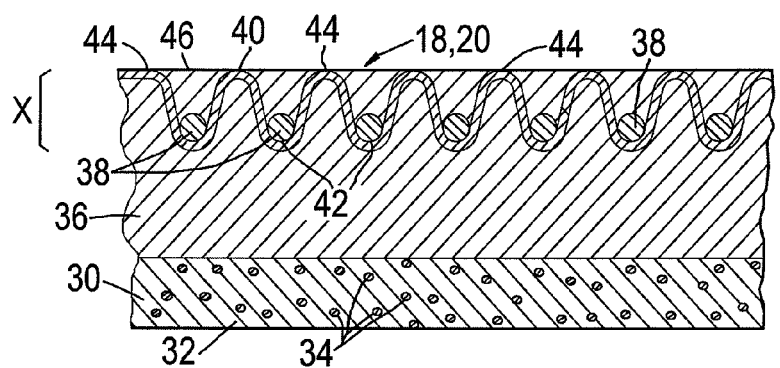
FIG. 5 is a cross-sectional view in the direction of arrows A-A in FIG. 3.

The tabs 18, 20, as shown in FIGS. 3, 4 and 5, are composite articles and comprise a composite member 30, a flexible member 36 and a plurality of shape memory material members 38. The composite member 30 has parallel longitudinally extending fibres 34 arranged in a matrix material 32. The plurality of shape memory material members 38 extend substantially parallel to each other and parallel to the composite member 30 and in particular parallel to the longitudinally extending fibres 34 in the composite member 30. The flexible member 36 is positioned between the composite member 30 and the plurality of shape memory material members 38 to bond the plurality of shape memory material members 38 to the composite member 30 and to maintain a separation between the composite member 30 and the plurality of shape memory material members 38. The shape memory material members 38 are circular cross-section wires and are embedded in a region X of the flexible member 36 and the region X is spaced from the composite member 30 by a distance Y.

At least one heat conducting member 40 is also embedded in the region X of the flexible member 36. The at least one heat conducting members 40 is provided around the shape memory material members 38. The at least one heat conducting member 40 is corrugated and has troughs 42 and peaks 44 arranged alternately and the troughs 42 and peaks 44 are parallel. Each shape memory material member 38 is located in and contacts a trough 42 of the corrugated heat conducting member 40. The peaks 44 of the corrugated heat conducting member 40 are arranged on an exterior surface 46 of the flexible member 36. The at least one heat conducting member 40 is embedded in the flexible member 36 and extends to the exterior surface of the flexible member 36.

The composite member 30 is designed to have a specific stiffness about its neutral axis B-B. The shape memory material members 38 are held in position substantially parallel to the composite member 30 and at a position maintained by the flexible member 36 and the flexible member 36 is chosen to allow strains similar to those used in shape memory material members 38 without suffering damage. The tabs 18, 20 are pre-stressed substantially as shown in FIG. 4. The composite member 30 is predominantly stressed in bending and this is opposed by the shape memory material members 38, which are held at an appropriate distance Y from the composite member 30 and the shape memory material members 38 are pre-stressed in tension, as shown in FIG. 4, or in compression. The composite member 30 is designed to have a high bending stiffness in the direction of actuation. At an equilibrium position, the bending moments about the neutral axis B-B are balanced and no movement occurs.

In operation, the shape memory material members 38 are activated to change their properties, e.g. Young's modulus or other parameter affecting the ability to resist a mechanical load. The shape memory material members 38 may be a magnetic shape memory material member, e.g. a magnetostrictive material member, an electric shape memory material member, e.g. a piezoelectric material member, an electro-active material member or an electro-active polymer (EAP), or a heat shape memory material member etc. Electro-active polymers (EAPs) in particular have high strain rate, but low modulus, which makes them particularly suited for use in the present invention. The tabs 18, 20 are moved between the first and second positions by providing a magnetic field in the case of magnetic shape memory material members 38 such that the magnetic field causes the magnetic shape memory material members 38 to change length and bend the tabs 18, 20. The tabs 18, 20 are moved between the first and second positions by providing an electric current through the electric shape memory material members in the case of electric shape memory material members 38 such that the electric current causes them to change length and bend the tabs 18, 20. The tabs 18, 20 are moved between the first and second positions by providing heat in the case of heat shape memory material members 38 such that the heat causes them to change length and bend the tabs 18, 20. The heat may be provided by supplying an electric current through the heat shape memory material members 38. The shape memory material members 38 are positioned radially within the composite article and move the composite member 30 from a non-deployed position to a deployed position to change the shape of a tab 18, 20.

The effective leverage due to the distance Y between the composite member 30 and the shape memory material members 38 allows a small area of the shape memory material members 38 to use a large strain at a relatively force to bend the composite member 30. The composite member 30 and the shape memory material members 38 act in opposition to each other. Reaction against external loads is achieved by the combined structure, the composite member 30, the flexible member 36 and the shape memory material members 38 acting as a thick beam, i.e. the elements act together to form stiff structure.

As mentioned previously the longitudinally extending fibres 34 of the composite member 30 and the shape memory material members 38 are parallel to each other and are arranged in the direction of bending, i.e., extend from left to right in FIGS. 3 and 4 or into the page in FIG. 5. It may be possible to provide extra fibres in the composite member 30 to increase the strength, integrity, of the composite member 30. In one arrangement, the composite member 30 may comprise laterally extending fibres arranged perpendicularly to the longitudinally extending fibres 34. It may also be possible to provide fibres in the flexible member 36 and including the region X around the shape memory material members 38. The flexible member 36 may have laterally extending fibres arranged perpendicularly to the longitudinally extending fibres 34 in the composite member 30, because these fibres only experience small strains. The laterally extending fibres may be woven, or stitched, with the longitudinally extending fibres in the composite member 30 to increase the through thickness stiffness and integrity. Alternatively, the composite member 30 may comprise chopped fibres to increase through thickness stiffness and integrity. The flexible member 36 may include chopped fibres.

The longitudinally extending fibres 34 in the composite member 30 may comprise any suitable fibres, for example carbon fibres or glass fibres, the laterally extending fibres may comprise any suitable fibres, for example carbon fibres or glass fibres and the chopped fibres may comprise any suitable fibres, for example carbon fibres or glass fibres. The matrix 32 of the composite member 30 may comprise a thermosetting polymer, for example an epoxy resin, a polyimide or foam. The flexible member 36 may comprise a thermosetting polymer, for example an epoxy resin, a polyimide or foam. The flexible member 36 may be formed at the same time and in the same process as the composite member 30.

The heat rejection from the shape memory material members 38 has a major influence on the heating rate, or actuation rate, the heat input required to maintain the deployed position and the cooling rate to cause retraction to the non-deployed position. It is believed that the cooling rate is more important of the two. Thus, as mentioned previously a heat conducting member 40 is embedded in the flexible member 36 and the troughs 42 are arranged to contact the shape memory material members 38 to conduct heat away from the shape memory material members 38 to the peaks 44 of the heat conducting member 40 and the exterior surface 46 of the flexible member 36, which forms an exterior surface of the composite article, where the heat may be transferred to a cooling fluid. A heat insulating layer or a heat conducting layer may be applied radially outward of the shape memory material members 38, either on the shape memory material members 38, partially on the shape memory material members 38 and partially on the exterior surface 46 of the flexible material 36 or on the exterior surface 46 of the flexible material 36, in order to optimize the heat transfer to the exterior surface 46 and into the cooling fluid. This may be used to optimize the compromise between heat input requirements for heating and cooling times.

Figure 6:
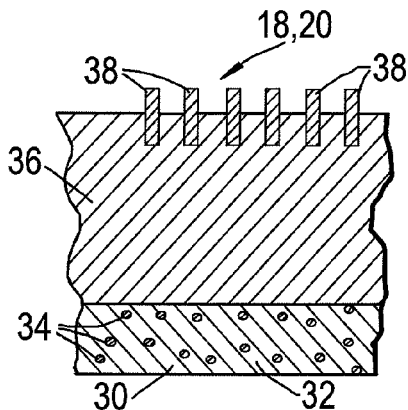
FIG. 6 is an alternative cross-sectional view in the direction of arrows A-A in FIG. 3.

FIG. 6 shows an alternative cross-sectional view in the direction of arrows A-A. In this arrangement the plurality of shape memory material members 38 comprises a plurality of shape memory material tapes. The shape memory material tapes 38 are embedded in the flexible member 36 and a portion of each shape memory material tape 38 projects outwardly from the flexible member 36 to form cooling fins. The shape memory material tapes 38 conduct heat to the exterior surface of the flexible member 36, where the heat may be transferred to a cooling fluid. This dispenses with the need for heat conducting members.

The plurality of shape memory material members may comprise at least one shape memory alloy or shape memory metal. There are heating means to heat the shape memory material members such that the shape memory material members move the composite member between the second non-deployed position and the first deployed position.

Alternatively, there are magnetic, electromagnetic means or electric apparatus to actuate the shape memory material members.

Although the present invention has been described with reference to the shape memory material members being positioned radially inside the composite member and to move the composite member from a non-deployed position to a deployed position to change the shape of a tab, it may be equally possible for the shape memory material members to be positioned radially outside the composite member and to move the composite member from a non-deployed position to a deployed position to change the shape of a tab or other member.

Figure 7:
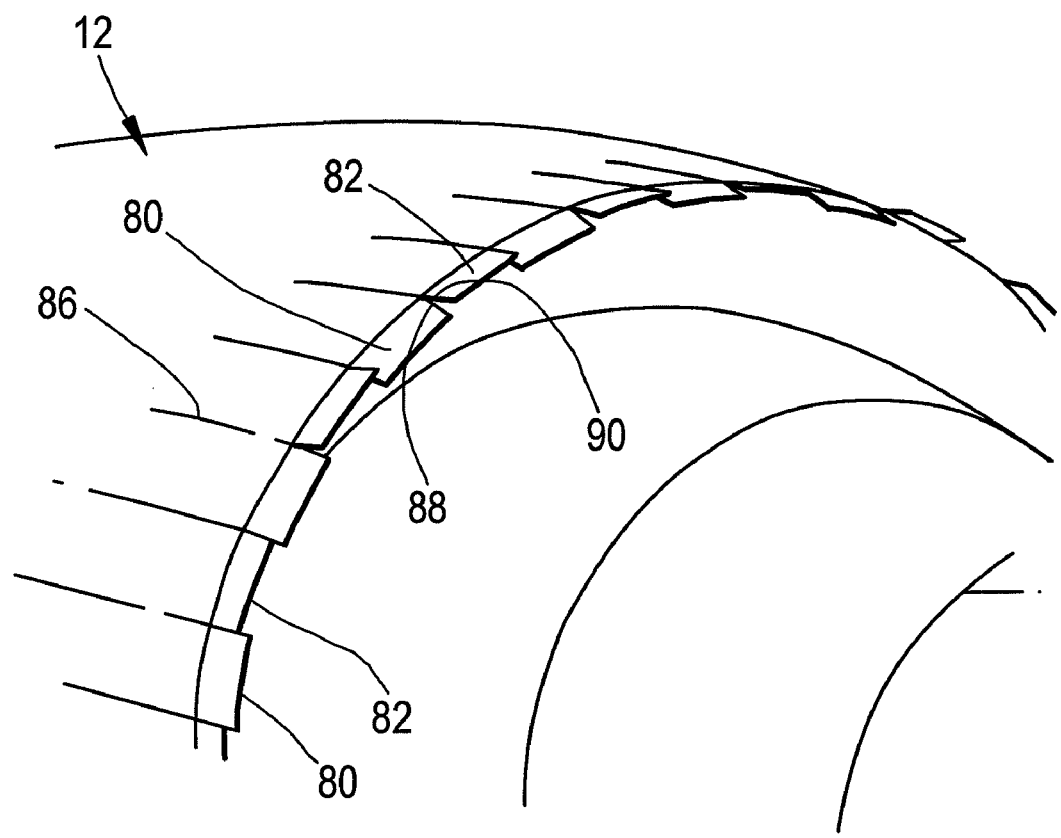
FIG. 7 is an enlarged perspective view of an alternative exhaust nozzle having noise reducing tabs having a composite article according to the present invention.

In these circumstances, as shown in FIG. 7 there are two sets of tabs 80 and 82. The tabs 80 are rigidly fixed in a deployed position and the tabs 82 comprise a composite member 30, a flexible member 36 and shape memory material members 38. The tabs 82 are movable between a deployed position as shown in FIG. 7 and a non-deployed position, where they are circumferentially aligned with tabs 80. At take off and climb the tabs 82 are deployed for noise reduction and the exit area of the nozzle 12 is enlarged. The enlargement reduces the velocity of the gas stream and intrinsically reduces noise. At cruise the tabs 82 are in the non-deployed position and the edges 88, 90 of the tabs 80 and 82 are in sealing engagement with one another, and the exit area of the nozzle 12 is reduced. The reduction in the exit area of the nozzle 12 increases the velocity of the exhaust gas stream and improves efficiency. The shape memory material members 38 are positioned radially outside the composite member 30 and move the composite member 30 from a non-deployed position to a deployed position to change the shape of the tab 82.

The composite article actuator described above may be used additionally in gas turbine engine aerofoils, e.g., compressor blades and compressor vanes to change their shape, for the control surfaces of aircraft, e.g., flaps, ailerons, spoilers, etc. on aircraft wings or control of flow of fluids in ducts, heat exchanger flows, etc.

What is claimed is:

1. A gas turbine engine comprising:
    an exhaust nozzle, the exhaust nozzle having a downstream end;
    at least one tab extending in a downstream direction from the downstream end of the exhaust nozzle, the tab having a composite article, with a composite member, a flexible member, and at least one shape memory material member,
    the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member,
    the at least one shape memory material member having an actuator to move the tab between a second non-deployed position and first deployed position, the composite member opposing actuation of the at least one shape memory material member.

2. A gas turbine engine as claimed in claim 1 wherein the exhaust nozzle is selected from the group comprising a fan exhaust nozzle and a core exhaust nozzle.

3. A gas turbine engine as claimed in claim 1 wherein there are heating means to heat the at least one shape memory material member such that the at least one shape memory material member moves the composite member between the second non-deployed position and the first deployed position.

4. A gas turbine engine as claimed in claim 1 wherein the composite member has longitudinally extending fibres in a matrix material.

5. A gas turbine engine as claimed in claim 1 wherein the at least one shape memory material member comprises a plurality of shape memory material wires.

6. A gas turbine engine as claimed in claim 1 wherein the at least one shape memory material member comprises a plurality of shape memory material tapes.

7. A gas turbine engine as claimed in claim 1 wherein the at least one shape memory material member is embedded in the flexible member.

8. A gas turbine engine as claimed in claim 1 wherein the at least one shape memory material member comprises at least one shape memory alloy or shape memory metal.

9. A gas turbine engine as claimed in claim 7 wherein a heat conducting member is provided around the at least one shape memory material member.

10. A gas turbine engine comprising:
    an exhaust nozzle, the exhaust nozzle having a downstream end;
    at least one tab extending in a downstream direction from the downstream end of the exhaust nozzle, the tab having a composite article, with a composite member, a flexible member, and at least one shape memory material member,
    the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member,
    the at least one shape memory material member being embedded in the flexible member,
    the at least one shape memory material member having an actuator to move the tab between a second non-deployed position and first deployed position, and
    a heat conducting member being provided around the shape memory material member,
    wherein the heat conducting member is embedded in the flexible member and extends to an exterior surface of the flexible member.

11. A gas turbine engine comprising:
    an exhaust nozzle, the exhaust nozzle having a downstream end;
    at least one tab extending in a downstream direction from the downstream end of the exhaust nozzle, the tab having a composite article, with a composite member, a flexible member, and at least one shape memory material member,
    the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member,
    the at least one shape memory material member having an actuator to move the tab between a second non-deployed position and first deployed position,
    the at least one shape memory material member comprising a plurality of shape memory material tapes, wherein the shape memory material tapes are embedded in the flexible member and a portion of each tape projects outwardly from the flexible member to form cooling fins.

12. A gas turbine engine as claimed in claim 1 wherein a thermal conductor layer or a thermal insulator layer is provided over on at least one shape memory material member.

13. A gas turbine engine as claimed in claim 12 wherein the thermal insulator layer or thermal conductor layer is arranged on the at least one shape memory material member, partially on the at least one shape memory material member and partially on an exterior surface of the flexible member or on an exterior surface of the flexible member.

14. A gas turbine engine as claimed in claim 1 wherein the tab is pre-stressed, the composite member is stressed in bending and the at least one shape memory material member is prestressed in tension or compression.

15. A gas turbine engine as claimed in claim 1 wherein the at least one shape memory material member is selected from the group comprising a magnetic shape memory material member, an electric shape memory material memory member and a heat shape memory material member.

16. A gas turbine engine as claimed in claim 4 wherein the composite member comprises laterally extending fibres arranged perpendicularly to the longitudinally extending fibres.

17. A gas turbine engine as claimed in claim 16 wherein the laterally extending fibres are woven with the longitudinally extending fibres.

18. A gas turbine engine as claimed in claim 1 wherein the composite member comprises chopped fibres.

19. A composite article comprising:
a composite member;
a flexible member; and
at least one shape memory material member,
the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member,
the at least one shape memory material member including an actuator to move the composite article between a non-deployed position and a deployed position, the composite member opposing actuation of the at least one shape memory material member.

20. A gas turbine engine as claimed in claim 1 wherein the flexible member comprises a thermosetting polymer.

21. A gas turbine engine as claimed in claim 20 wherein the thermosetting polymer is selected from the group consisting of an epoxy resin, a polyimide and a foam.

22. A gas turbine engine as claimed in claim 4 wherein the matrix material comprises a thermosetting polymer.

23. A gas turbine engine as claimed in claim 22 wherein the thermosetting polymer is selected from the group consisting of an epoxy resin, a polyimide and a foam.

24. A gas turbine engine as claimed in claim 1 wherein each of the composite member, the flexible member and the at least one shape memory material member extend the full length of the tab.

25. A gas turbine engine as claimed in claim 1 wherein each of the composite member and the at least one shape memory material member extend the full length of the tab.

* * * * *